United States Patent
Korkalo et al.

(10) Patent No.: US 10,705,217 B2
(45) Date of Patent: Jul. 7, 2020

(54) CONTROLLING MULTIPLE IMAGING SENSORS

(71) Applicant: Teknologian tutkimuskeskus VTT Oy, Espoo (FI)

(72) Inventors: Otto Korkalo, Espoo (FI); Petri Honkamaa, Espoo (FI); Paul Kemppi, Espoo (FI); Tommi Tikkanen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 16/094,117

(22) PCT Filed: Apr. 24, 2017

(86) PCT No.: PCT/FI2017/050309
§ 371 (c)(1),
(2) Date: Oct. 16, 2018

(87) PCT Pub. No.: WO2017/187014
PCT Pub. Date: Nov. 2, 2017

(65) Prior Publication Data
US 2019/0120963 A1    Apr. 25, 2019

(30) Foreign Application Priority Data
Apr. 25, 2016  (FI) ........................................ 20165359

(51) Int. Cl.
*G06T 7/80* (2017.01)
*H04N 13/282* (2018.01)
(Continued)

(52) U.S. Cl.
CPC ............ *G01S 17/87* (2013.01); *G01S 7/4808* (2013.01); *G01S 7/497* (2013.01); *G01S 17/66* (2013.01);
(Continued)

(58) Field of Classification Search
CPC ............................. G06T 7/285; H04N 5/2258
See application file for complete search history.

(56) References Cited

U.S. PATENT DOCUMENTS

| 6,789,039 B1 * | 9/2004 | Krumm ................. G01C 11/06 |
| | | 702/150 |
| 2011/0025853 A1 * | 2/2011 | Richardson .......... H04N 5/2256 |
| | | 348/159 |

(Continued)

OTHER PUBLICATIONS

Munaro, et al., "OpenPTrack: People Tracking for Heterogeneous Networks of Color-Depth Cameras", IAS-13 Workshop Proceedings: 1st Intl. Workshop on 3D Robot Perception with Point Cloud Library, pp. 235-247, Padova, Italy Jul. 2014. Abstract, chapters 3-5, 7.

(Continued)

*Primary Examiner* — Paulos M Natnael
(74) *Attorney, Agent, or Firm* — Leason Ellis LLP

(57) ABSTRACT

An apparatus for controlling a plurality of imaging sensor nodes producing 3D structure of a scene is provided. The apparatus receives (500) location data from the sensor nodes, the location data indicating the locations of the moving objects, compares (502) the location data received from different sensor nodes at the same time instants with each other and determines (504) which detections of different sensor nodes relate to same moving objects. The apparatus further maps (600) the location data received from different sensor nodes to a common coordinate system and determines (602) the relationships of the fields of view of the (Continued)

sensor nodes with each other and the location data mapped to the common coordinate system.

10 Claims, 5 Drawing Sheets

(51) Int. Cl.
  *H04N 13/246*  (2018.01)
  *H04N 13/271*  (2018.01)
  *H04N 13/243*  (2018.01)
  *H04N 13/00*  (2018.01)
  *G01S 17/87*  (2020.01)
  *G01S 17/66*  (2006.01)
  *G01S 17/89*  (2020.01)
  *G01S 7/48*  (2006.01)
  *G01S 7/497*  (2006.01)
  *H04N 5/247*  (2006.01)
  *G06T 7/292*  (2017.01)

(52) U.S. Cl.
  CPC .............. *G01S 17/89* (2013.01); *G06T 7/292* (2017.01); *G06T 7/85* (2017.01); *H04N 5/247* (2013.01); *H04N 13/243* (2018.05); *H04N 13/246* (2018.05); *H04N 13/271* (2018.05); *H04N 13/282* (2018.05); *G06T 2207/30244* (2013.01); *H04N 2013/0085* (2013.01); *H04N 2013/0092* (2013.01)

(56) References Cited

U.S. PATENT DOCUMENTS

| | | | | |
|---|---|---|---|---|
| 2014/0177915 | A1* | 6/2014 | Fan | G06T 7/74 382/103 |
| 2014/0267666 | A1* | 9/2014 | Holz | G06K 9/00355 348/77 |
| 2014/0361928 | A1* | 12/2014 | Hughes | G01S 19/48 342/463 |
| 2015/0355311 | A1* | 12/2015 | O'Hagan | G01S 5/021 340/539.13 |
| 2015/0378002 | A1* | 12/2015 | Hughes | G01S 5/0294 342/451 |

OTHER PUBLICATIONS

Geiselhart, F., Otto M., Rukzio, E., "On the use of Multi-Depth-Camera based Motion Tracking Systems in Production Planning Environments" $48^{th}$ CIRP CMS 2015, abstract, chapters 3-5. PDF available Dec. 2016.

Basso F., Levorato, R., Menegatti, E., "Online Calibration for Networks of Cameras and Depth Sensors", $12^{th}$ Workshop on Non-Classical Cameras, Camera Networks and Omnidirectional Vision, OMNIVIS Jun. 2014, chapters I-III.

Darrell T. et al., "Plan-view trajectory estimation with dense stereo background models", Eighth IEEE International Conference on Computer Vision ICCV Jul. 2001.

48th CIRP International Conference on Manufacturing Systems, CIRP CMS, Ischia, Italy, Jun. 2015, ISBN: 978-1-5108-2073-9) http://toc.proceedings.com/39812webtoc.pdf (retrieved Dec. 13, 2016): javascript:alert(document.lastModified): Mar. 30, 2016 16:53:05.

\* cited by examiner

CONTROLLING MULTIPLE IMAGING SENSORS

CROSS-REFERENCE TO RELATED PATENT APPLICATIONS

This application is a U.S. National Phase Application under 35 U.S.C. § 371 of International Patent Application No. PCT/FI2017/050309, filed Apr. 24, 2017, which claims the priority of Finnish Application No. 20165359, filed Apr. 25, 2016, each of which is incorporated by reference as if expressly set forth in its entirety herein.

TECHNICAL FIELD

The exemplary and non-limiting embodiments of the invention relate generally to controlling a system with one or more imaging sensor nodes producing 3D structure of a scene.

BACKGROUND

Tracking movements of people or other moving objects such as vehicles is useful in many applications. One known solution for implementing the tracking is to use depth cameras. With depth cameras and suitable control system it is possible to monitor a given area and determine the location of moving objects and their movements.

When multiple cameras are used to monitor a given area, it is necessary to establish a relationship between the cameras so that the total area to be monitored may be reliably covered. Each camera has a different field of view which may be partly overlapping with each other. The tracking operation should naturally be as accurate and reliable as possible. Thus, when the monitored objects move from the field of view of a camera to the field of view of another camera the system should be able to keep track of the objects in a reliable manner.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus for controlling a plurality of imaging sensor nodes producing 3D structure of a scene, each sensor node having a local coordinate system and a given field of view at least partially different from fields of view of other sensor nodes, the nodes configured to detect locations of moving objects within the field of view of the node, the apparatus being configured to receive location data from the sensor nodes, the location data indicating the locations of the moving objects at a given time instant; compare the location data received from different sensor nodes at the same time instants with each other; performing a first determination on the basis of comparisons which detections of different sensor nodes relate to same moving objects; performing a second determination on the basis of the first determination on the relationships of the fields of view of the sensor nodes with each other; mapping the location data received from different sensor nodes to a common coordinate system; optimising the relationships of the fields of view of the sensor nodes with each other and the location data mapped to the common coordinate system by minimising the squared differences between the location data related to a moving object and mapped to local coordinate system and to the common coordinate system.

According to an aspect of the present invention, there is provided a system comprising a plurality of imaging sensor nodes producing 3D structure of a scene and a controller, each sensor node having a local coordinate system and a given field of view at least partially different from fields of view of other sensor nodes, the nodes configured to detect locations of moving objects within the field of view of the node, the controller being configured to receive location data from the sensor nodes, the location data indicating the locations of the moving objects at a given time instant; compare the location data received from different sensor nodes at the same time instants with each other; performing a first determination on the basis of comparisons which detections of different sensor nodes relate to same moving objects; performing a second determination on the basis of the first determination on the relationships of the fields of view of the sensor nodes with each other; mapping the location data received from different sensor nodes to a common coordinate system; optimising the relationships of the fields of view of the sensor nodes with each other and the location data mapped to the common coordinate system by minimising the squared differences between the location data related to a moving object and mapped to local coordinate system and to the common coordinate system.

According to an aspect of the present invention, there is provided a method for controlling a plurality of imaging sensor nodes producing 3D structure of a scene, each sensor node having a local coordinate system and a given field of view at least partially different from fields of view of other sensor nodes, the method comprising: receiving location data from the sensor nodes, the location data indicating in the local coordinate system of the sensor node the locations of the moving objects in the field of view of the sensor node at a given time instant; comparing the location data received from different sensor nodes at the same time instants with each other; performing a first determination on the basis of comparisons which detections of different sensor nodes relate to same moving objects; performing a second determination on the basis of the first determination on the relationships of the fields of view of the sensor nodes with each other; mapping the location data received from different sensor nodes to a common coordinate system; and optimising the relationships of the fields of view of the sensor nodes with each other and the location data mapped to the common coordinate system by minimising the squared differences between the location data related to a moving object and mapped to local coordinate system and to the common coordinate system.

According to yet another aspect of the present invention, there is provided a computer program product embodied on a distribution medium readable by a computer and comprising program instructions which, when loaded into an apparatus, execute a computer process comprising: receiving location data from a plurality of imaging sensor nodes producing 3D structure of a scene, each sensor node having a local coordinate system and a given field of view at least partially different from fields of view of other sensor nodes, the location data indicating in the local coordinate system of the sensor node the locations of the moving objects in the field of view of the sensor node at a given time instant; comparing the location data received from different sensor nodes at the same time instants with each other; performing a first determination on the basis of comparisons which detections of different sensor nodes relate to same moving objects; performing a second determination on the basis of the first determination on the relationships of the fields of view of the sensor nodes with each other; mapping the location data received from different sensor nodes to a common coordinate system; and optimising the relationships of the fields of view of the sensor nodes with each other and the location data mapped to the common coordinate system by minimising the squared differences between the location data related to a moving object and mapped to local coordinate system and to the common coordinate system.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Figure 1:
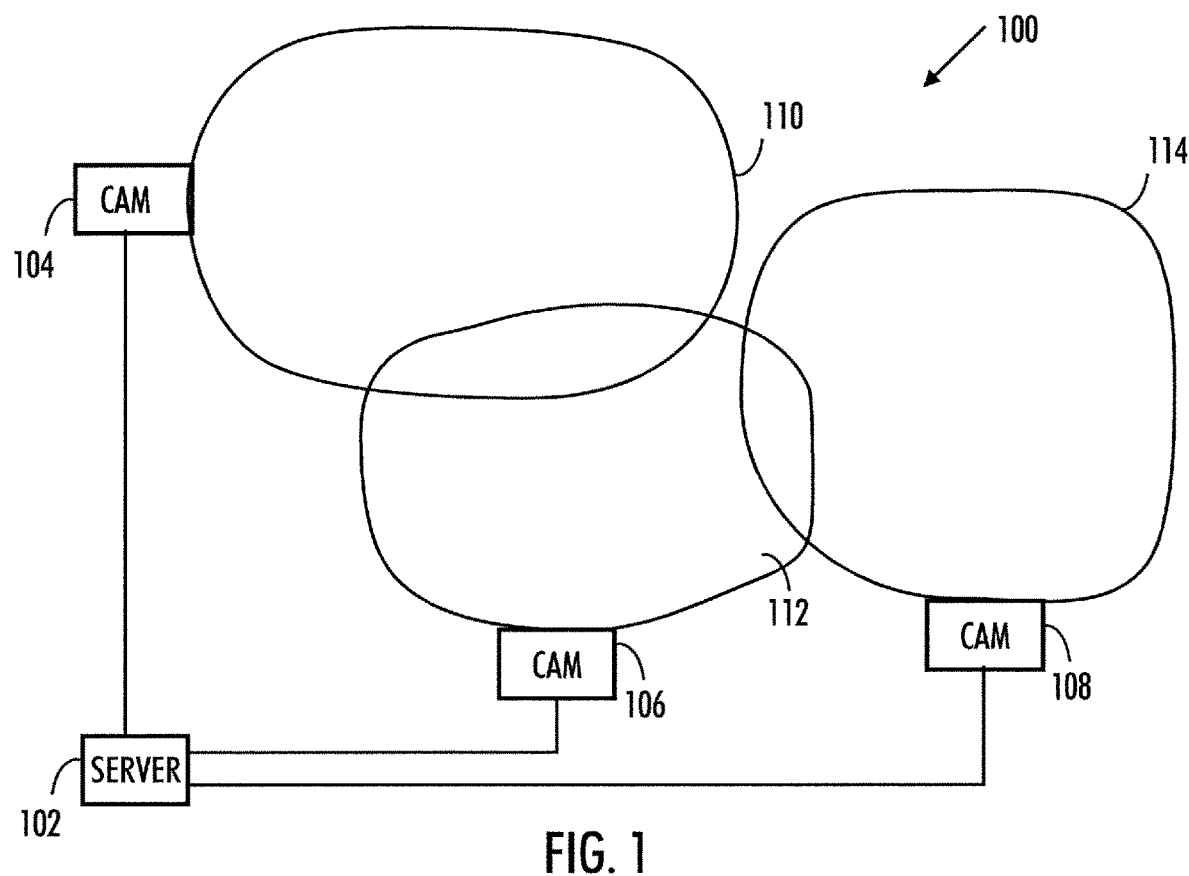
FIG. 1 illustrates a simplified example of a tracking system.

FIG. 1 illustrates a simplified example of a tracking system 100 with having multiple camera nodes. The camera nodes may be depth cameras, stereo cameras, Light Detection and Ranging (LIDAR) or other imaging devices that produce 3D structure of a scene. For simplicity, the term depth camera is used in following. In this example, the system comprises three depth camera nodes 104, 106, 108. In practise, the number of camera nodes in a system may be greater. In an embodiment, the camera node comprises a depth camera or a stereo or a depth camera and embedded computing unit for processing depth (or stereo) camera stream. In this example, each node comprises one camera. In some applications it is also possible that a node comprises more than one camera view different field of view. Each camera of the system may have an unique identification code.

The nodes may be installed to the area to be monitored in such a manner that the whole desired part of the area to be monitored is covered with the multiple cameras. In the non-limiting example of FIG. 1, the node 104 has the field of view 110, the node 106 has the field of view 112 and the node 108 has the field of view 114, and the fields of view are partly overlapping.

In an embodiment, the nodes are configured to capture images or depth frames and detect movement on the basis of the images captured by the cameras. These detections may be denoted as observations.

In an embodiment, a plan-view method is utilised in the system 100. In plan-view method, the environment captured by the cameras is presented from top-view perspective so that the targets move on the xy-plane defined by the floor of the monitored area. Each node may have its own local coordinate system on which the observations are mapped.

The nodes may be connected to an apparatus such as a controller or a server 102. The nodes may be configured to send the observations to the server. In an embodiment, the observations are sent using user datagram protocol, UDP. However, any other communications protocol may be used as well. The server may be configured to process and/or combine information sent by the different nodes. In an embodiment, one of the nodes may act as the server.

In an embodiment, the server is configured to take care of the system calibration and tracking of the targets across different cameras. The server may align the observations to a common coordinate frame using mappings from sensor's local plan-view domain to global frame, and take care of the track management and tracking.

For the server to be able to track moving objects across areas covered by different cameras, the topology of the system and mappings from the local coordinate system from a global frame must be know. In prior art, this involves manual calibration using interactive tools. Semi-automatic calibration using known reference targets that are detected from each sensor may be utilised in the process. The calibration procedure is time consuming and thus costly.

Figure 2:
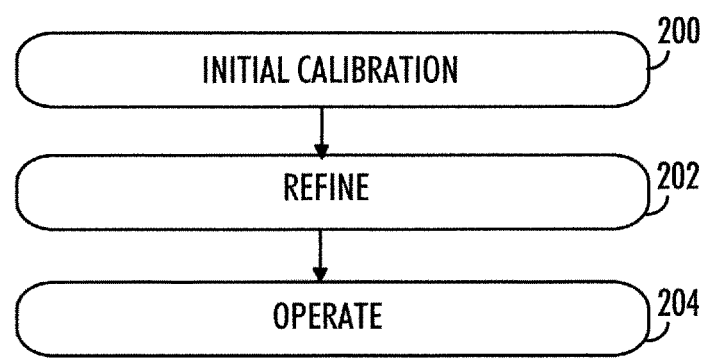
FIG. 2 is a flowchart illustrating an example of calibration of the system.

In an embodiment, the proposed system may perform self-calibration and determine the topology of the system without human interaction. This speeds up the installation of the system considerably. In an embodiment, as FIG. 2 illustrates, the proposed solution comprises initial calibration 200, where the coarse topology of the system is determined. After determining the topology, the camera relations are refined 202 using global optimisation procedure. After the calibration steps, the system is ready to operate 206. These steps will be described in more detail below.

Figure 3A:
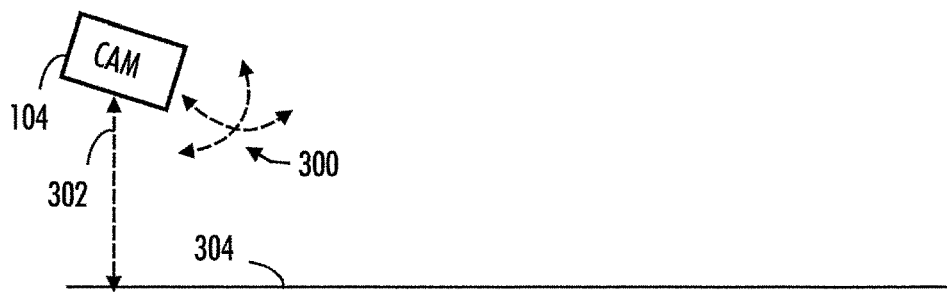
FIGS. 3A and 3B illustrate the calibration of a camera of a node.
Figure 3B:
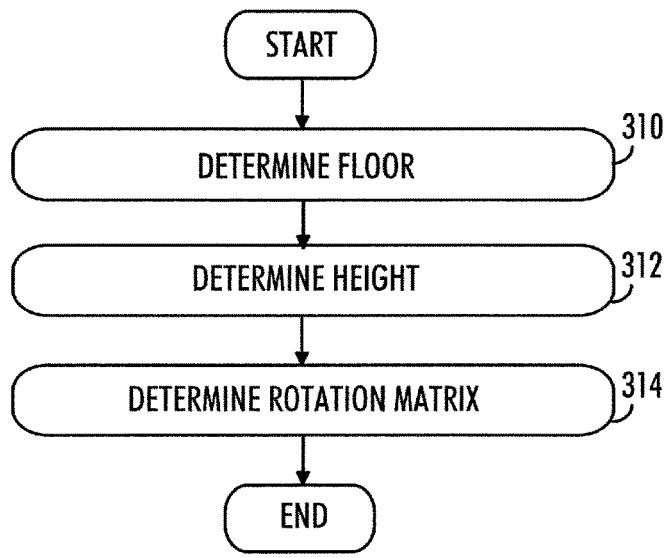

First, the initial calibration of the cameras of the nodes 104, 106, 108 is performed as is illustrated in FIGS. 3A and 3B. For constructing a local plan-view representation, the computing unit of the node must know the camera orientation 300 and height 302 from the floor level 304. In the proposed solution, they are defined automatically.

The camera is configured to capture images or depth frames and detect a large horizontal surface from the depth frames from the depth frames. If such a surface is found, it is determined in step 310 to be the floor plane.

In step 312 height of the camera 104 relative to the floor levels calculated.

In step 314 the orientation (rotation matrix) 300 of the camera is determined. The rotation matrix and the camera height may be called local extrinsic parameters of the camera.

Figure 4:
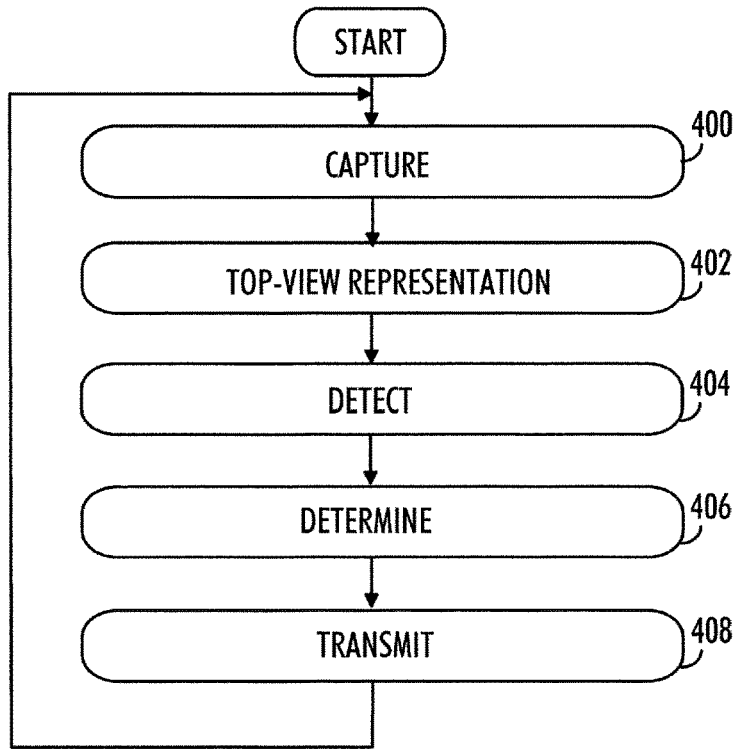
FIG. 4 is a flowchart illustrating the operation of a node.

Flowchart of FIG. 4 illustrates typical operation of a node.

In step 400, images or depth frames are captured and converted into three dimensional point clouds using known camera intrinsic parameters (focal length, principal point). The point cloud describes each point of the field of view of the camera. The amount of points of the point cloud depends on the resolution of the camera.

In step 402, the point cloud is then rendered from top-down perspective using the local extrinsic parameters and an orthogonal projection matrix. The resulting top-view image can be represented as a height map relative to the floor level, but other formats such as 3D voxel grid can be utilised as well. The top-view image describes the elevation of each point from the floor of the field of view of the camera, where the number of points depends on the resolution of the camera. In the height map image, the floor level is set to zero. On the other hand, in 3D voxel grid, each image pixel is represented by an array, so it can store multiple height levels. The top-view image may be downscaled to fixed size (e.g. 100×100 pixels). In an embodiment, each node 104, 106, 108 operates in its local plan-view coordinate system and is unaware of the other nodes.

In step 404, the moving targets are detected from the top-view images. In an embodiment, the targets may be detected by utilizing background subtraction, and finding the local maxima from the foreground top-view images. Thus, the observed area is captured when there are no moving objects in the area and a background top-view image is created. When operating, the captured top-view image may be compared to the background image and moving targets or objects detected.

In an embodiment, other properties of each target or object such as its height, volume, colour histogram of the target extracted from the original video frames (in case of stereo pair), infrared histogram of the target extracted from the original infrared frames (in case of depth camera) etc. may be determined in step 406.

In step 408, the node is configured to transmit to the controller or server 102 location data, i.e. the 2D positions (xy-coordinates of node's local plan-view coordinate system) of the targets or objects. In an embodiment, the camera unique identification code, as well as the current timestamp may be included to the data sent to the server. In an embodiment, the properties of each target or object (determined in step 406) are included in the data sent to the server.

The procedure continues from step 400.

Figure 5:
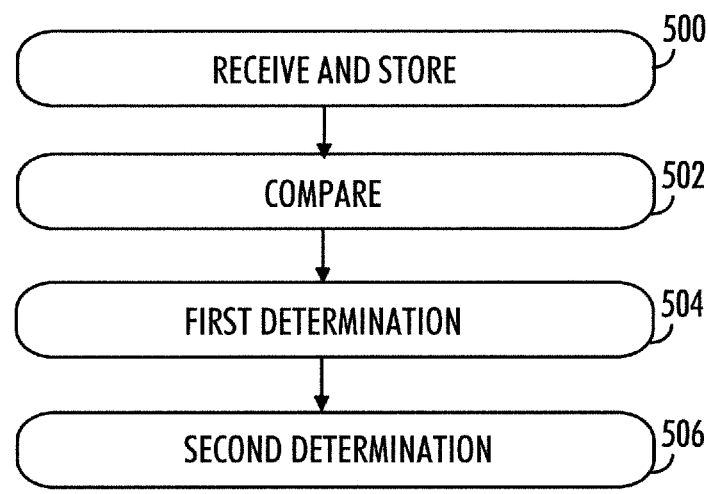
FIG. 5 is a flowchart illustrating the calibration of the system.

Flowchart of FIG. 5 illustrates operation of the controller or server 102 during the initial calibration, where the topology of the system is determined.

Figure 6A:
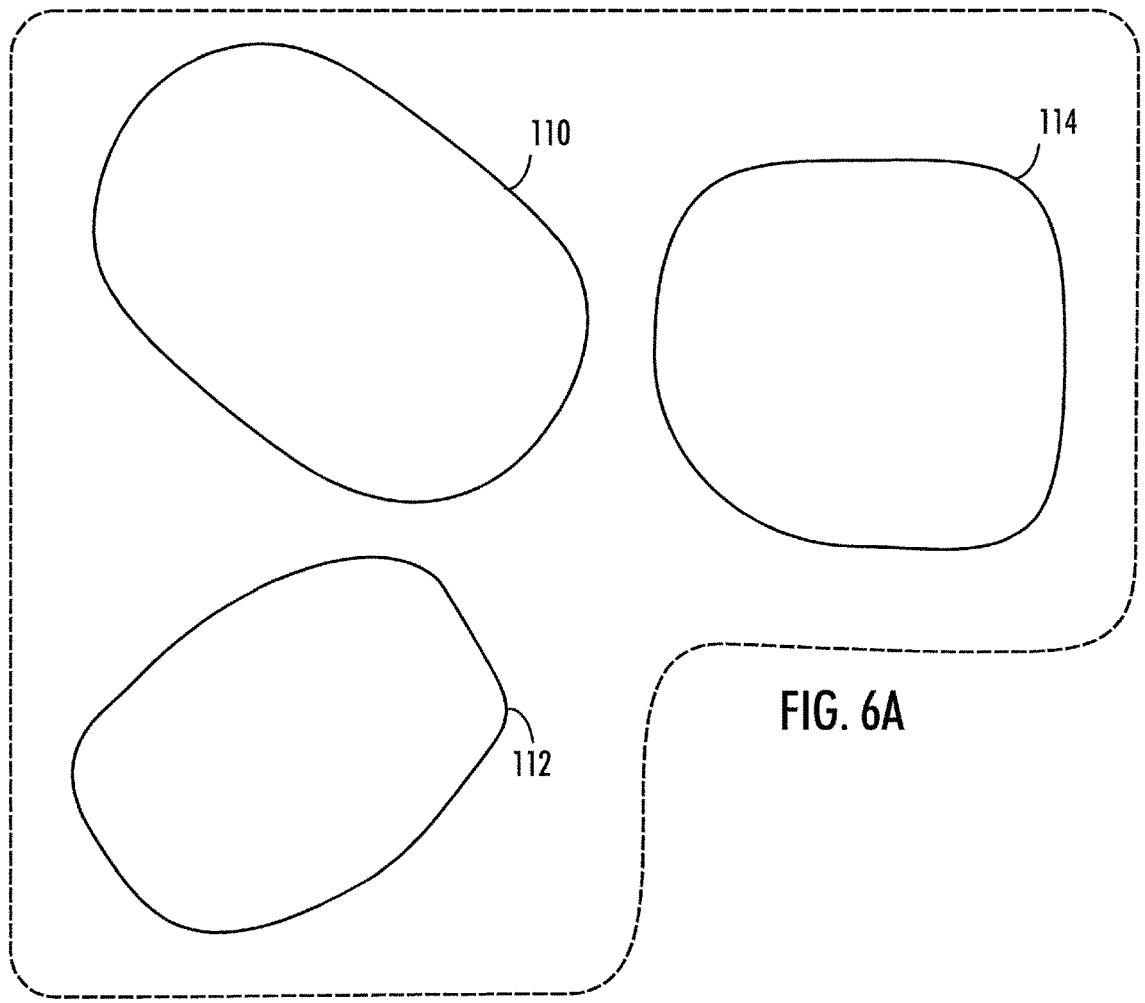
FIGS. 6A and 6B illustrate the calibration of the system.

When the system is setup, the server has no knowledge of the location of the cameras and the relationship of the coverage areas of each camera in relation to each other. The system network topology is thus unknown at this point. The situation is illustrated in FIG. 6A. Each camera is aware of its own field of view 110, 112, 114 but there is no knowledge in the server whether the fields of view are overlapping and if they so, where the overlapping areas are.

In step 500, the server is configured to receive location data from the cameras, the location data indicating the locations of the moving objects at a given time instant. As mentioned, the camera unique identification code as well as the current timestamp may be included to the data. The server may store the data it receives from the camera nodes to a database.

In step 502, the server is configured to compare the location data received from different cameras at the same time instants with each other.

The server may be configured to match the measurements between all possible camera pairs. An observation made in a first camera is matched to an observation in a second camera if the time difference between the observations is smaller than a predefined time limit. Thus, adjacent coverage areas may be detected. Cameras with overlapping areas may be denoted as a camera pair.

Depending on the input data, there may be multiple matches from the observations made in the first camera to the observations made in the second camera. In addition to the timestamps, other features extracted from the target (size, volume, colour histogram, IR intensity histogram, etc.) may be used for finding the correct matches, and to suppress wrong matches. The measurement matches may be used to find the initial mappings between the plan-view domains of the cameras.

In step 504, the server is configured to perform a first determination on the basis of comparisons which detections of different cameras relate to same moving objects. In an embodiment, two dimensional rigid transformations (2D rotation and translation) are used to define the mappings. These transformations may be solved using a suitable algorithm. In an embodiment, RANSAC algorithm may be used. RANSAC (random sample consensus) is a known iterative mathematical algorithm which is typically used to estimate parameters from a set of data which may comprise outliers. Also other corresponding algorithms may naturally be used. The result of the algorithm used is a set of camera pairs. i.e initial mapping about how the coverage areas of cameras are overlapping.

At each RANSAC iteration step, the fitness of the candidate mapping is evaluated. This may be done by calculating the ratio of inliers that satisfy the mapping and other points (outliers). The comparison is done within the overlapping area of the cameras. Thus, the ratio in comparable between different configurations (whether the overlap is large or small).

It is common that the algorithms such as RANSAC find also solutions which are not correct. Thus, the algorithms may suggest a solution although a camera pair is not in reality overlapping. In step 506, as a confirmation to detect false camera pairs, the server may be configured to perform a second determination on the basis of the first determination on the relationships of the fields of view of the depth cameras with each other. From the remaining camera pairs, a network describing the camera network topology is constructed.

In an embodiment, one of the camera nodes 104, 106, 108 is selected as a base camera, and the mappings from each camera are calculated to the base camera coordinates by traversing the network and combining the pairwise mappings. As there may be missing camera pairs in the network, Djikstra's algorithm may be used, for example, to find the shortest paths from the base camera to the other cameras. Dijkstra's algorithm is a common algorithm for finding the shortest paths between nodes in a graph. Other corresponding algorithms exist, such as Bellman-Ford algorithm and Floyd-Warshall algorithm, to name a few. The resulting network describes the cameras of the system in common (base camera's) plan-view coordinate system.

Figure 6B:
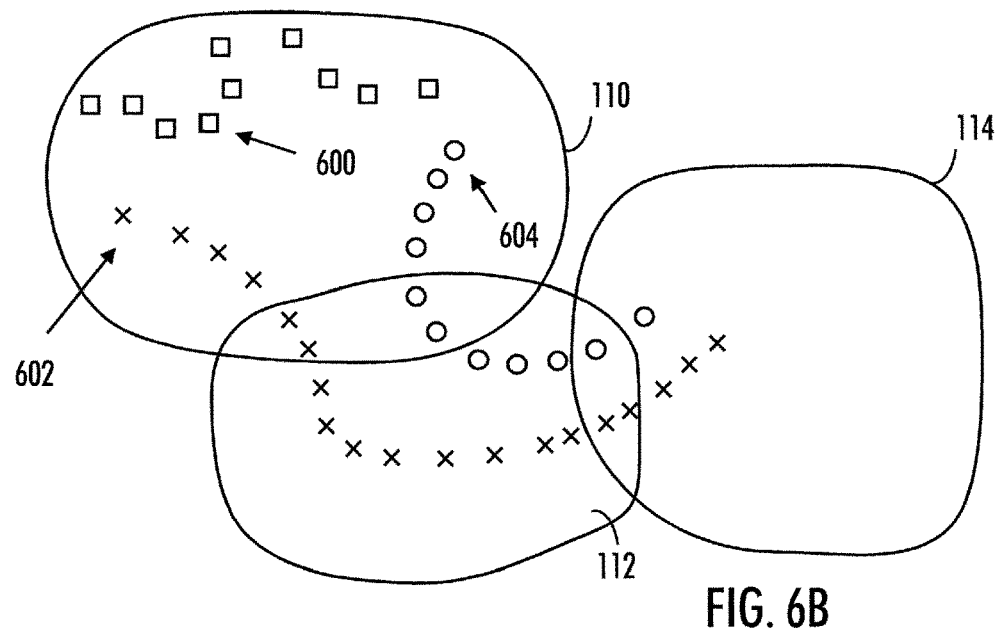

FIG. 6B illustrates the calibration process. Each camera has detected a set of observations. In this example, after the initial calibration process, the observations have been processed and three sets 600, 602, 604 have been identified. These three sets are determined to be three different moving objects. Two of the objects move from the coverage area of a camera to the coverage area of neighbouring camera. These observations enable the server to determine how the coverage areas are located in relation with each other. On the basis of the determination the relative rotation and relative location of each area 110, 112, 114 is found.

Figure 7:
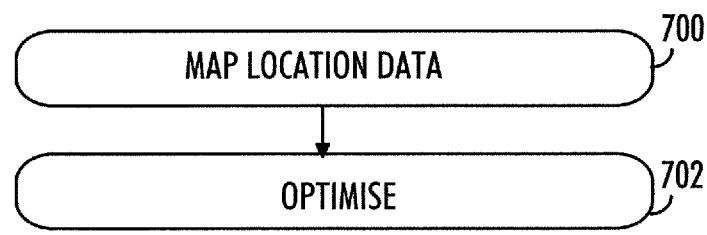
FIG. 7 is a flowchart illustrating the second phase of the calibration of the system.

The topology found during the initial calibration of the camera network may be somewhat inaccurate and thus the initial calibration may be refined with a global optimisation routine that distributes possible errors evenly. Flowchart of FIG. 7 illustrates operation of the controller or server 102 during the refine calibration where the system topology is defined in a more detailed manner by detecting and correcting errors of the coarse topology.

In step 700, the server is configured to map the location data received from different cameras to a common coordinate system.

In step 702, the server is configured to optimise the relationships of the fields of view of the depth cameras with each other and the location data mapped to the common coordinate system by minimising the squared differences between the location data related to a moving object and mapped to local coordinate system and to the common coordinate system.

Each camera operates using its own local coordinate system and the location data sent from the cameras uses the coordination system of the camera. The server is configured to associate the location data received from the cameras with a mapping that transforms the observations from the camera's local coordinate system to a global coordinate system.

The problem may be parameterized with $M*N+K*2$ parameters where M is the number of parameters of the camera mapping, N is the number of cameras and K is the number of observations seen by two or more cameras.

Thus, not only the camera mappings are optimized but also the positions of the observations in global coordinate system as well. M depends on the used mapping. For rigid 2D transformation it equals 3 (translation and rotation angle) but other mappings such as 2D homographies may be used as well.

The initial positions of the observations in the global coordinate system may be determined by transforming them to base camera coordinate system by using the initial mappings calculated according to initial calibration. Similarly, the initial mappings from the cameras to the base camera may be used as first guesses for the camera mappings. The optimisation may be conducted by minimising the squared differences of the global target positions and corresponding local camera observations that are transformed to global coordinate system using the current estimate of the camera mapping.

The optimisation problem can be solved using standard (non-linear least squares) optimisation tools, such as Levenberg-Marquardt, for example. To make the system more robust, a Huber estimator may be applied. The local extrinsic and intrinsic parameters of the cameras may be inaccurate. Thus, the local plan view map produced by the cameras may be become distorted. These distortions can be compensated by replacing the 2D rigid transformation with 2D affine transformation that has 6 degrees-of-freedom. Furthermore, depth cameras typically suffer from lens and depth distortions and they can be partly compensated by using a planar homography (8 degrees of freedom) for the camera mapping.

Additionally, more complex models such as polynomial mappings may be used to compensate non-linear errors. The optimization routine can be extended by adding the local extrinsic parameters of the cameras to the system. For providing the required constraints, constant human height assumption may be applied. By setting the z-dimension (top-view value) of the observations to constant, the camera orientation and height parameters may be optimized as well.

Returning to FIG. 6B, the relative rotations and relative locations of the areas 110, 112, 114 is fine tuned. In addition, some transformations, linear or non-linear, to the mapping of local coordinate system of each camera to the global coordinate system may be made. These transformations correct the possible errors arising from camera distortions. Thus, in addition to fine tuning the coverage areas with each other, the locations of the observations in the global coordinate system may be fine-tuned.

The procedures described above in connection with the flowcharts may also be performed "offline". The images or frames captured by the depth cameras may be stored. The processing of the stored data may be performed later.

When the system is in operation, and the controller or server receives location data from the cameras, the server may map it correctly to the global coordinate system so that the movement of the moving object from one coverage area to another is as smooth as possible.

Figure 8A:
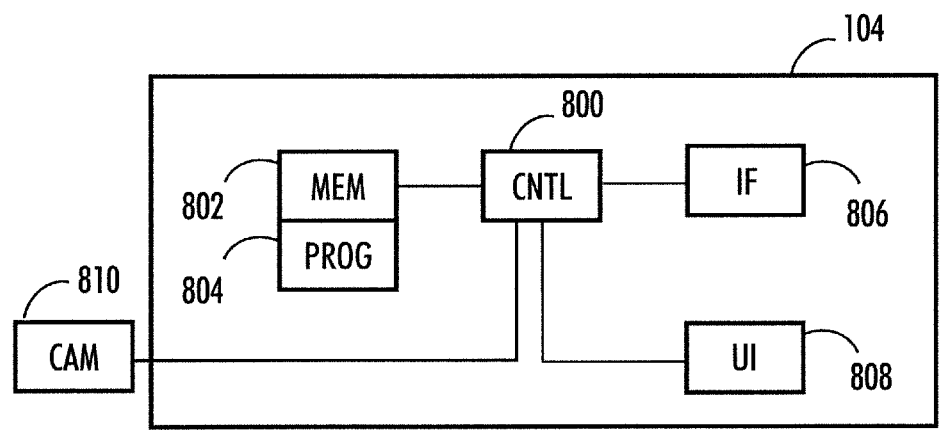
FIGS. 8A and 8B illustrate simplified examples of apparatuses applying some embodiments of the invention.
Figure 8B:
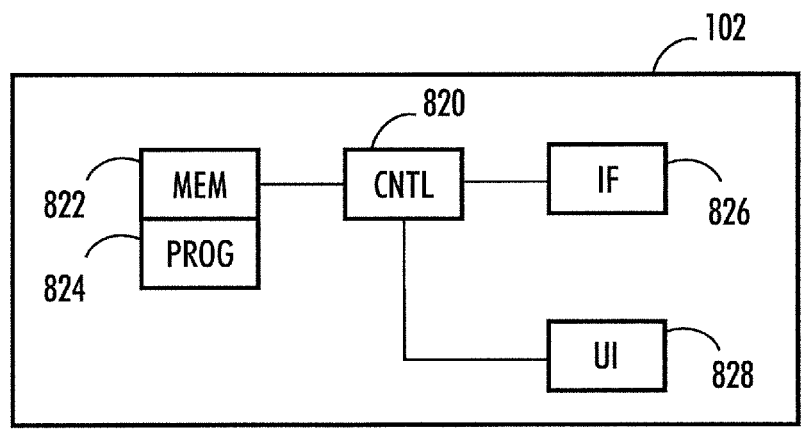

FIGS. 8A and 8B illustrate an embodiment. The figures illustrate simplified example of apparatuses applying embodiments of the invention.

It should be understood that the apparatuses are depicted herein as an examples illustrating some embodiments. It is apparent to a person skilled in the art that the apparatuses may also comprise other functions and/or structures and not all described functions and structures are required. Although the each apparatus has been depicted as one entity, different modules and memory may be implemented in one or more physical or logical entities.

In some embodiments, the apparatus of FIG. 8A may be a node 104, 106, 108 or a part of a node. The apparatus of the example includes a control circuitry 800 configured to control at least part of the operation of the apparatus.

The apparatus may comprise a memory 802 for storing data. Furthermore the memory may store software 804 executable by the control circuitry 800. The memory may be integrated in the control circuitry.

The apparatus may further comprise an interface circuitry 806 configured to connect the apparatus to other devices, to server 102, for example. The interface may provide a wired or wireless connection.

The apparatus may further comprise user interface 808 such as a display, a keyboard and a mouse, for example.

The apparatus may comprise a depth or stereo camera 810, LIDAR or other imaging device that produces 3D structure of the scene or more than one such imaging devices. The camera may be an internal or external part of the apparatus.

In some embodiments, the apparatus of FIG. 8A may be realised with a mini- or microcomputer with a suitable interface to cameras and other devices.

In some embodiments, the apparatus of FIG. 8B may be the controller or server 102 or a part of a controller or server. In an embodiment, the controller or server is realised in connection or as a part of a node. The apparatus of the example includes a control circuitry 820 configured to control at least part of the operation of the apparatus.

The apparatus may comprise a memory 822 for storing data. Furthermore the memory may store software 824 executable by the control circuitry 820. The memory may be integrated in the control circuitry.

The apparatus may further comprise an interface circuitry 826 configured to connect the apparatus to other devices and to nodes 104, 106, 108. The interface may provide a wired or wireless connection.

The apparatus may further comprise user interface 828 such as a display, a keyboard and a mouse, for example.

In some embodiments, the apparatus of FIG. 3 may be realised with a computer with a suitable interfaces.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for controlling a plurality of imaging sensor nodes producing 3D structure of a scene, each sensor node having a local coordinate system and a given field of view, field of views of adjacent sensor nodes being at least partially overlapping, the nodes configured to detect locations of moving objects within the field of view of the node, the apparatus being configured to receive location data from the sensor nodes, the location data indicating the locations of the moving objects at a given time instant;

compare the location data received from different sensor nodes at the same time instants with each other;

performing a first determination on the basis of comparisons to obtain initial determination of which detections of different sensor nodes relate to same moving objects;

performing a second determination on the basis of the first determination to eliminate false determinations from the initial estimation to construct a network describing the sensor network topology by determining sensor node pairs having adjacent fields of view;

mapping the location data received from different sensor nodes to a common coordinate system;

optimising the relationships of the fields of view of the sensor nodes with each other and the location data mapped to the common coordinate system by minimising the squared differences between the location data related to a moving object and mapped to local coordinate system and to the common coordinate system.

2. The apparatus according to claim 1, wherein the apparatus is configured to receive properties of the moving objects from the sensor nodes in connection with the location data.

3. The apparatus according to claim 2, the apparatus being further configured to utilise received properties of the moving objects when performing the first determination.

4. The apparatus according to claim 2, wherein the properties of the moving objects comprise at last one of the following: height, volume, colour histogram or infrared histogram of the moving object.

5. A system comprising a plurality of imaging sensor nodes producing 3D structure of a scene, each sensor node having a local coordinate system and a given field of view, field of views of adjacent sensor nodes being at least partially overlapping, the nodes configured to detect locations of moving objects within the field of view of the node, and a controller, the controller configured to receive location data from the sensor nodes, the location data indicating the locations of the moving objects at a given time instant;

compare the location data received from different sensor nodes at the same time instants with each other;

performing a first determination on the basis of comparisons to obtain initial determination of which detections of different sensor nodes relate to same moving objects;

performing a second determination on the basis of the first determination to eliminate false determinations from the initial estimation to construct a network describing the sensor network topology by determining sensor node pairs having adjacent fields of view;

mapping the location data received from different sensor nodes to a common coordinate system;

optimising the relationships of the fields of view of the sensor nodes with each other and the location data mapped to the common coordinate system by minimising the squared differences between the location data related to a moving object and mapped to local coordinate system and to the common coordinate system.

6. The system according to claim 5, wherein the sensor nodes are configured to capture depth frames forming a three dimensional point cloud of the field of view of the sensor;

transform the three dimensional point cloud into a top-view representation having an orthogonal projection.

7. A method for controlling a plurality of imaging sensor nodes producing 3D structure of a scene, each sensor node having a local coordinate system and a given field of view, field of views of adjacent sensor nodes being at least partially overlapping, the method comprising:

receiving location data from the sensor nodes, the location data indicating in the local coordinate system of the sensor node the locations of the moving objects in the field of view of the sensor node at a given time instant;

comparing the location data received from different sensor nodes at the same time instants with each other;

performing a first determination on the basis of comparisons to obtain initial determination of which detections of different sensor nodes relate to same moving objects;

performing a second determination on the basis of the first determination to eliminate false determinations from the initial estimation to construct a network describing the sensor network topology by determining sensor node pairs having adjacent fields of view;

mapping the location data received from different sensor nodes to a common coordinate system; and optimising the relationships of the fields of view of the sensor nodes with each other and the location data mapped to the common coordinate system by minimising the squared differences between the location data related to a moving object and mapped to local coordinate system and to the common coordinate system.

8. The method according to claim 7, further comprising: determining in the second determination sensor node pairs having adjacent fields of view.

9. The method according to claim 7, further comprising:

receiving from the sensor properties of the moving objects connection with the location data and utilising received properties of the moving objects when performing the first determination.

10. A non-transitory computer program product embodied on a distribution medium readable by a computer and comprising program instructions which, when loaded into an apparatus, execute a computer process comprising:

receiving location data from a plurality of imaging sensor nodes producing 3D structure of a scene, each sensor node having a local coordinate system and a given field of view, field of views of adjacent sensor nodes being at least partially overlapping, the location data indicating in the local coordinate system of the sensor node the locations of the moving objects in the field of view of the sensor node at a given time instant;

comparing the location data received from different sensor nodes at the same time instants with each other;

performing a first determination on the basis of comparisons to obtain initial determination of which detections of different sensor nodes relate to same moving objects;

performing a second determination on the basis of the first determination to eliminate false determinations from the initial estimation to construct a network describing the sensor network topology by determining sensor node pairs having adjacent fields of view;

mapping the location data received from different sensor nodes to a common coordinate system; and optimising the relationships of the fields of view of the sensor nodes with each other and the location data mapped to the common coordinate system by minimising the squared differences between the location data related to a moving object and mapped to local coordinate system and to the common coordinate system.

\* \* \* \* \*